(12) United States Patent
Zagalsky et al.

(10) Patent No.: US 11,398,982 B2
(45) Date of Patent: Jul. 26, 2022

(54) SYSTEM AND METHOD FOR PROCESSING A NETWORK MESSAGE (71) Applicant: INSIDE PACKET LTD., Yakum (IL)

(72) Inventors: Michael Zagalsky, Hod Hasharon (IL); Michael Frank, Karnei Shomron (IL); Eli Karpilovski, Herzlia (IL)

(73) Assignee: INSIDE PACKET LTD., Yakum (IL)

( * ) Notice: Subject to any disclaimer, the term of this patent is extended or adjusted under 35 U.S.C. 154(b) by 0 days.

(21) Appl. No.: 17/022,105

(22) Filed: Sep. 16, 2020

(65) Prior Publication Data
US 2022/0086087 A1 Mar. 17, 2022

(51) Int. Cl.
H04L 12/741 (2013.01)
H04L 45/745 (2022.01)

(52) U.S. Cl.
CPC .................. *H04L 45/745* (2013.01)

(58) Field of Classification Search
CPC .................................... H04L 45/745
See application file for complete search history.

(56) References Cited

U.S. PATENT DOCUMENTS

| 7,916,728 | B1* | 3/2011 | Mimms | H04L 45/54 370/392 |
| 7,979,671 | B2* | 7/2011 | Aviles | G06F 12/0813 711/216 |
| 2006/0036618 | A1* | 2/2006 | Shuma | G06F 16/2282 |
| 2013/0136011 | A1* | 5/2013 | Tardo | H04L 63/1416 370/252 |
| 2013/0163426 | A1* | 6/2013 | Beliveau | H04L 47/2441 370/235 |
| 2013/0182700 | A1* | 7/2013 | Figura | H04L 43/04 370/352 |
| 2015/0124825 | A1* | 5/2015 | Dharmapurikar | H04L 45/7453 370/392 |

* cited by examiner

Primary Examiner — Kevin M Cunningham
(74) Attorney, Agent, or Firm — Pearl Cohen Zedek Latzer Baratz LLP (57) ABSTRACT A computer-implemented method of processing computer data packets may include applying a mapping-function to a set of attributes of a packet to produce a location of a flow state entry (FSE) in a state-table, wherein each row in the state-table includes at least two FSEs. A system and method may determine the state of a flow based on the content of the FSE and may select an action based on the state.

17 Claims, 3 Drawing Sheets

APPLYING A MAPPING-FUNCTION TO A SET OF ATTRIBUTES OF A PACKET TO PRODUCE A LOCATION OF A FLOW STATE ENTRY (FSE) WHEREIN EACH ROW IN THE STATE-TABLE INCLUDES AT LEAST TWO FSEs

410

DETERMINING THE STATE OF A FLOW BASED ON THE CONTENT OF THE FSE ~415

SELECTING AN ACTION BASED ON THE STATE ~420

PERFORMING THE SELECTED ACTION ~425

SYSTEM AND METHOD FOR PROCESSING A NETWORK MESSAGE

FIELD OF THE INVENTION

The present invention relates generally to processing network messages. More specifically, the present invention relates to extending the capacity of a state-table used in processing computer network data packets.

BACKGROUND OF THE INVENTION

Data traffic in computer networks is forwarded and processed by network processing devices, such as switches and routers or smart network interface cards (NICs) devices. These devices typically implement a packet processing pipeline (hereinafter pipeline). For example, programmable pipeline devices (PPDs) may be, or may include, application-specific integrated circuit devices (ASICs), field programmable gate arrays (FPGAs), programmable logic devices (PLDs), system on a chip (SOC) and the like.

A pipeline typically includes a set or sequence of stages. A stage may be, for example, a physical part or component in a programmable device programmed or otherwise adapted to process a packet. A stage may be viewed as a component or unit adapted to examine an process a packet, e.g., each stage in a PPD may include executable code stored in a memory and the stage may include or use a controller to execute executable code. Upon receiving a packet, a stage in a pipeline typically searches a table for an entry corresponding to, or matching the packet (a match as referred to in the art and herein), and, if a match is made or found, the stage processes the (matched) packet according to information in the entry (an action as referred to in the art and herein). Accordingly, as referred to in the art and herein, stages are match-and-action units.

Stages in a pipeline process a packet serially, according to their fixed order. Generally processing a packet by a pipeline includes processing the packet by the first stage in the pipeline, forwarding the packet to the second or next stage in the pipeline and so on. More specifically, a stage may select whether or not to process a packet, however, a packet travels through all stages even if some of the stages merely receive and forward the packet untouched.

Tables used by stages are referred to in the art and herein as lookup tables (or look up or look-up or state table). Lookup tables (also referred to in the art and herein as state tables) typically include information that describes a flow's state. For example, a lookup table may include a large number of flow state entries (FSEs) where each FSE includes a description or other data related to a specific flow. When processing a packet, a unit (e.g., stage as described) may map, associate or match, the packet to/with an FSE and process the packet based on information in the FSE.

A flow may be, may include, or it may be defined as, a set of packets that include (or share) a common attribute. A common attribute of packets in, or of a flow, may be a common or same value in a header of the packets, e.g., a flow may be, may include or it may be defined by all packets that include the same destination internet protocol (IP) address (DIP address). A common attribute may be determined or calculated based on any number of parts or portion of a packets. For example, a flow may be, may include or it may be defined by, or based on, all packets that include the same DIP and the same source IP address (SIP), or a flow may be all packets with the same DIP and the same SIP and, in addition, the same value in a specific offset in the packet (e.g., a value in the payload of a packet).

For example, as described by the Internet Engineering Task Force (IETF), a flow is defined as defined as a set of packets or frames passing an observation point in the network during a certain time interval. All packets belonging to a particular flow have a set of common properties. Each property is defined as the result of applying a function to the values of: 1) one or more packet header fields (e.g., destination IP address), transport header fields (e.g., destination port number), or application header fields (e.g., real time protocol (RTP) header fields), 2) one or more characteristics of the packet itself (e.g., number of Multi-protocol label switching (MPLS) labels) and 3) one or more fields derived from packet treatment (e.g., next hop IP address, output interface).

Since attributes of packets defining a flow may be extracted from any part (or network layer) of the packets, e.g., from the application layer (L7 as known in the art), a flow may be, may include, or it may be defined based on, a set of packets related to a specific service or a specific application, for example, possibly in addition to values in headers, a common attribute defining a flow may be, or may include, a common value in a specific offset in the application layer portion of packets. Typically, when processing an incoming or received packet, a key value (or simply a key) is constructed or calculated, e.g., by each or some of the stages in a PPD. A key is typically used for mapping a packet to a flow within the scope of a specific stage, application or service.

A key is typically defined, constructed or calculated based on the packet, e.g., based on values in headers and/or content of/in the packet and/or any attribute of the packet. Keys (or key values) are calculated or constructed such that they are unique with respect to flows, that is, keys are constructed such that no two or more flows have the same key (or key value). At each stage in a PPD, packets are typically mapped to flows using a key, e.g., a key may be used, at each stage of a PPD, to perform a lookup in a flows Lookup Table (LUT) in order to find an entry that stores the state of, or other information related to a packet.

Accordingly, as viewed, processed or treated by a PPD, a flow may be, may include or may be defined by, the set of packets for which the same key (or key value) is constructed or calculated. Typically, a specific service or application is provided or supported for a specific flow, accordingly, by identifying a flow, a stage in a PPD may know, identify or determine the relevant service or application that is to be provided.

A key generated or created for a packet is used, e.g., by a PPD, for the match part in a match-action stage, scheme, paradigm, e.g., the key is used to find (match) an entry in a lookup table that matches the packet (or determine there is no match if an entry does not exist or cannot by found in the table), for example, a key's value may be an index or offset pointing to an entry in a state table.

Current and/or known systems and methods suffer from a number of drawbacks. For example, the size (number or entries or rows) of a state table (also referred to herein as "state-table") is a limiting factor with respect to up scaling a device or system, e.g., the number of applications that can be implemented by a device (or by a pipeline) is limited by the size of a state-table in the device or system.

To overcome the limitations resulting from state-table size, known systems and methods add, or chain, multiple devices and distribute the application processing across the chained or connected devices. This results in an increase in costs, space, power consumption and management complexity. Other known systems and methods use devices with general-purpose central processing units (CPUs) and large general-purpose memory, as opposed to custom match-and-action devices. However, this solution suffers from significantly lower performance, e.g. lower throughput and increased latency. Accordingly, there is a need in the art for a system and method that extends the capacity of a state-table in network devices.

SUMMARY OF THE INVENTION

An embodiment for processing computer data packets may include applying a mapping-function to a set of attributes of a packet to produce a location of a flow state entry (FSE) in a state-table, wherein each row in the state-table includes at least two FSEs. An FSE may be used to determine a state of a flow.

A mapping function (also referred to herein as "mapping-function") applied to a set of attributes of a packet may provide a row in the state-table and an offset in the row. The state-table may be included in a programmable pipeline device. A first FSE in a row or entry of a state-table may describe a state of a first flow and a second, different FSE in the row or entry may describe a state of a second, different flow.

A first portion of an FSE may be included in a first row of the state-table and a second portion of the FSE may be included in a second, different row of the state-table. An action may be selected based on information in an FSE. An embodiment may add an FSE to a state-table, remove an FSE from a state-table and update an FSE in a state-table. Other aspects and/or advantages of the present invention are described herein.

BRIEF DESCRIPTION OF THE DRAWINGS

Non-limiting examples of embodiments of the disclosure are described below with reference to figures attached hereto that are listed following this paragraph. Identical features that appear in more than one figure are generally labeled with a same label in all the figures in which they appear. A label labeling an icon representing a given feature of an embodiment of the disclosure in a figure may be used to reference the given feature. Dimensions of features shown in the figures are chosen for convenience and clarity of presentation and are not necessarily shown to scale. For example, the dimensions of some of the elements may be exaggerated relative to other elements for clarity, or several physical components may be included in one functional block or element. Further, where considered appropriate, reference numerals may be repeated among the figures to indicate corresponding or analogous elements.

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings. Embodiments of the invention are illustrated by way of example and not of limitation in the figures of the accompanying drawings, in which like reference numerals indicate corresponding, analogous or similar elements, and in which:

DETAILED DESCRIPTION OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, and components, modules, units and/or circuits have not been described in detail so as not to obscure the invention. Some features or elements described with respect to one embodiment may be combined with features or elements described with respect to other embodiments. For the sake of clarity, discussion of same or similar features or elements may not be repeated.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. The term set when used herein may include one or more items.

Unless explicitly stated, the method embodiments described herein are not constrained to a particular order in time or to a chronological sequence. Additionally, some of the described method elements can occur, or be performed, simultaneously, at the same point in time, or concurrently. Some of the described method elements may be skipped, or they may be repeated, during a sequence of operations of a method.

Figure 1A:
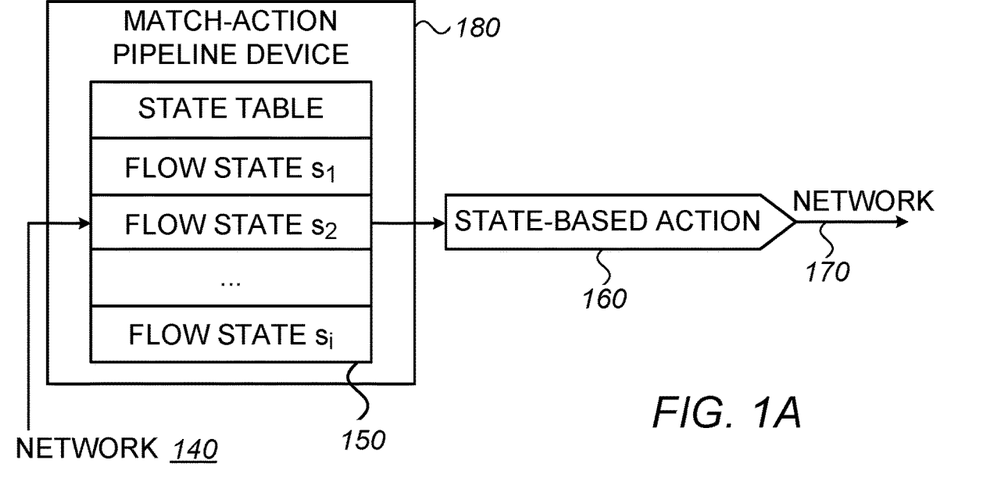
FIG. 1A is an overview of a prior art system.

Reference is made to FIG. 1A, a prior art computing device 180. As shown, computer data packets (e.g. including digital data) may enter computing device 180 from network 140 and a state table 150 in computing device 180 may be used for finding the state of the relevant flow. Generally, packets, messages or other forms of data entering computing device 180 are classified and matched to a certain flow (the 'Match' phase). As referred to herein, a packet, message, segment or frame may be a unit of information sent, over a network or over a communication bus, from one entity to another. Computers may exchange packets over a network. Examples of such matching functions are a direct-match function where a key calculated based on header and content of an entering packet serves as an index to state-table 150, in some cases, a hash function applied to the key serves as a pointer to an entry or row in state-table 150. Flows states are described (or encoded) in state-table 150 (also referred to in the art as a lookup table), where each entry corresponds to a certain flow. Of course, the number of flows a device or system can handle simultaneously is limited by the number of entries in table 150. Entries in table 150 are flow state entries, accordingly, they may be referred to herein as FSEs.

As shown by block 160, packets are subjected to a packet processing logic according to their content and the state of the corresponding flow ('Action' phase). That is, the state of the relevant flow may be determined based on information in state-table 150 and the processing at block 160 is done according to the state. Processed packets (e.g., modified packets) may be sent out to network 170 as shown, of course, networks 140 and 170 may be different networks or they may be the same network.

Figure 1B:
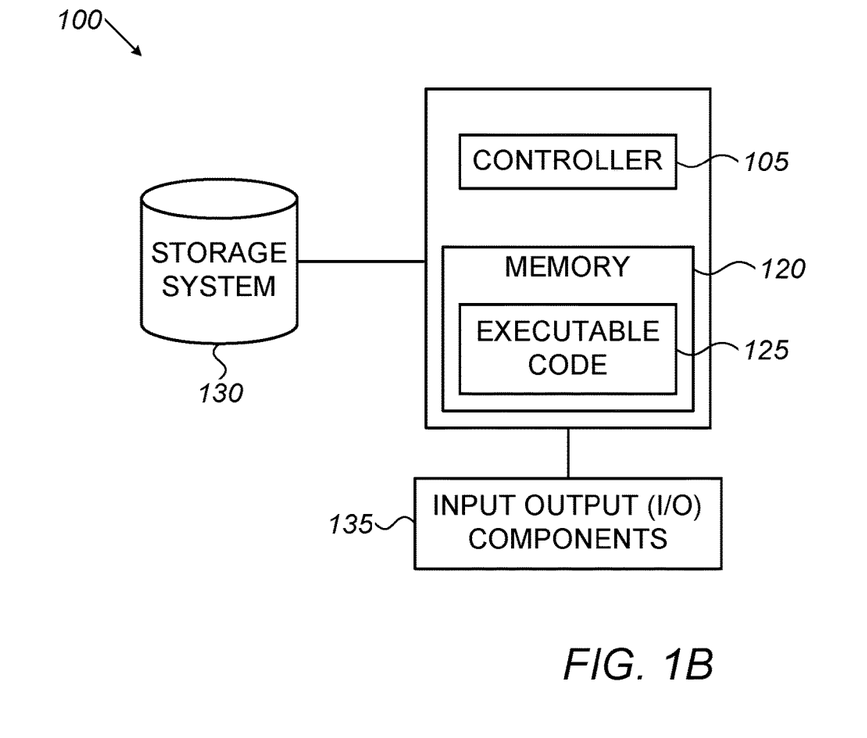
FIG. 1B shows a block diagram of a computing device according to illustrative embodiments of the present invention.

Reference is made to FIG. 1B, showing a non-limiting, block diagram of a computing device or system 100 that may be used to control operation of a computer network device according to some embodiments of the present invention. Computing device 100 may include a controller 105 that may a hardware controller. For example, computer hardware processor or hardware controller 105 may be, or may include, a central processing unit processor (CPU), a chip or any suitable computing or computational device. Computing system 100 may include a memory 120, executable code 125, a storage system 130 and input/output (I/O) components 135. Controller 105 (or one or more controllers or processors, possibly across multiple units or devices) may be configured (e.g., by executing software or code) to carry out methods described herein, and/or to execute or act as the various modules, units, etc., for example by executing software or by using dedicated circuitry. More than one computing devices 100 may be included in, and one or more computing devices 100 may be, or act as the components of, a system according to some embodiments of the invention.

Memory 120 may be a hardware memory. For example, memory 120 may be, or may include machine-readable media for storing software e.g., a Random-Access Memory (RAM), a read only memory (ROM), a memory chip, a Flash memory, a volatile and/or non-volatile memory or other suitable memory units or storage units. Memory 120 may be or may include a plurality of, possibly different memory units. Memory 120 may be a computer or processor non-transitory readable medium, or a computer non-transitory storage medium, e.g., a RAM. Some embodiments may include a non-transitory storage medium having stored thereon instructions which when executed cause the processor to carry out methods disclosed herein.

Executable code 125 may be an application, a program, a process, task or script. A program, application or software as referred to herein may be any type of instructions, e.g., firmware, middleware, microcode, hardware description language etc. that, when executed by one or more hardware processors or controllers 105, cause a processing system or device (e.g., system 100) to perform the various functions described herein.

Executable code 125 may be executed by controller 105 possibly under control of an operating system. For example, executable code 125 may be an application that, using graphical systems or methods, receives input from a user, and configures a network devices according to the input as further described herein. Although, for the sake of clarity, a single item of executable code 125 is shown in FIG. 1, a system according to some embodiments of the invention may include a plurality of executable code segments similar to executable code 125 that may be loaded into memory 120 and cause controller 105 to carry out methods described herein. For example, units or modules described herein, e.g., management unit 210 further described herein, may be, or may include, controller 105, memory 120 and executable code 125.

Storage system 130 may be or may include, for example, a hard disk drive, a universal serial bus (USB) device or other suitable removable and/or fixed storage unit. Content may be loaded from storage system 130 into memory 120 where it may be processed by controller 105. For example, functional block data and configuration data may be loaded into memory 120 and used for configuring and operating a network device as further described herein.

In some embodiments, some of the components shown in FIG. 1 may be omitted. For example, memory 120 may be a non-volatile memory having the storage capacity of storage system 130. Accordingly, although shown as a separate component, storage system 130 may be embedded or included in system 100, e.g., in memory 120.

I/O components 135 may be, may be used for connecting (e.g., via included ports) or they may include: a mouse; a keyboard; a touch screen or pad or any suitable input device. I/O components 135 may include one or more screens, touchscreens, displays or monitors, speakers and/or any other suitable output devices. Any applicable I/O components may be connected to computing device 100 as shown by I/O components 135, for example, a wired or wireless network interface card (NIC), a universal serial bus (USB) device, a wire directly connecting computing device 100 to a network device, or an external hard drive may be included in I/O components 135.

A system according to some embodiments of the invention may include components such as, but not limited to, a plurality of central processing units (CPU) or any other suitable multi-purpose or specific processors, controllers, microprocessors, microcontrollers, field programmable gate arrays (FPGAs), programmable logic devices (PLDs), system on a chip (SOC) or ASIC. A system according to some embodiments of the invention may include a plurality of input units, a plurality of output units, a plurality of memory units, and a plurality of storage units. A system may additionally include other suitable hardware components and/or software components. In some embodiments, a system may include or may be, for example, a personal computer, a desktop computer, a laptop computer, a workstation, a server computer, a network device, or any other suitable computing device.

Figure 2:
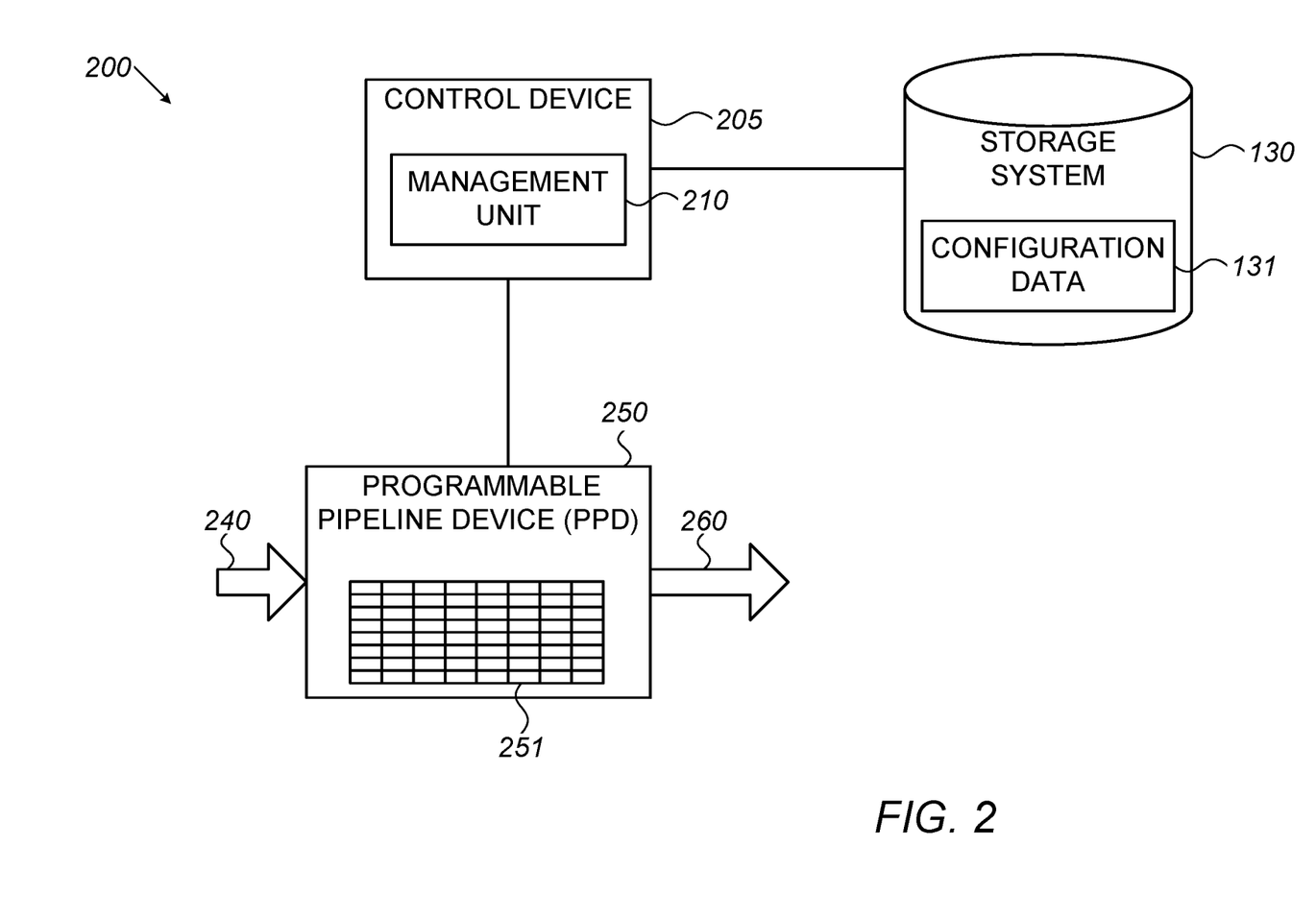
FIG. 2 shows a system according to illustrative embodiments of the present invention.

Reference is made to FIG. 2, an overview of a system 200 according to some embodiments of the present invention. As shown, a system 200 may include a control device 205 that may include a management unit (MU) 210. Control device 205 and MU 210 may be, or may include components of, computing device 100. For example, MU 210 may include a controller 105, a memory 120 and one or more executable code 125 segments or objects.

As further shown, control device 205 may be connected to a storage system 130 that may include configuration data 131. Data objects in storage system 130, e.g., configuration data 131, may be any suitable digital data structure or construct or computer data objects that enable storing, retrieving and modifying data and information. For example, configuration data 131 may be, or may include, files, tables, or lists in a database in storage system 130.

Data may be loaded from storage system 130 into memory 120 where it may be processed by controller 105. For example, some of configuration data 131 may be loaded into memory 120 and used for configuring, and/or controlling operation of, programmable pipeline device (PPD) 250 as further described herein.

PPD 250 (that may be connected to control device 205) may be a network device, e.g., a network processors, a smart NIC, a programmable switch, an ASIC, a packet processing or network processing chip or any other applicable unit. As shown, at least one input 240 and at least one output 260 may be connected to PPD 250, for example, input 240 and output 260 may be network cables or they may be or include wireless components. Input 240 may enable PPD 250 to receive input, e.g., in the form of network messages, data packets or data segments and output 260 may enable PPD 250 to provide output, e.g., in the form of network messages, packets or segments. It will be noted that typically, input 240 may include a number of input lines or pins enabling PPD 250 to receive input from a plurality of input sources, similarly, more than one output line or channel may be included in output 260 thus enabling PPD 250 to selectively send or provide output over one or more lines, cables, pins etc.

As shown, PPD 250 may include one or more tables 251, e.g., state-tables as described herein. State-table 251 may be, or may include, computer hardware such as, for example, state-table 251 may be a part of an FPGA unit or an ASIC. Tables 251 may be created, filled or populated with values by control device 205. For example, control device 205 may create a table 251 and download the table to PPD 250 or control device 205 may create table 251 by directly accessing a memory in PPD 250 or control device 205 may command PPD 250 to create and fill state-table 251, e.g., based on configuration data 131. In some embodiments PPD 250 may be a programmable switch and control device 205 may create and/or update state-table 251 using systems and/or methods for programming programmable devices as known in the art.

Figure 3:
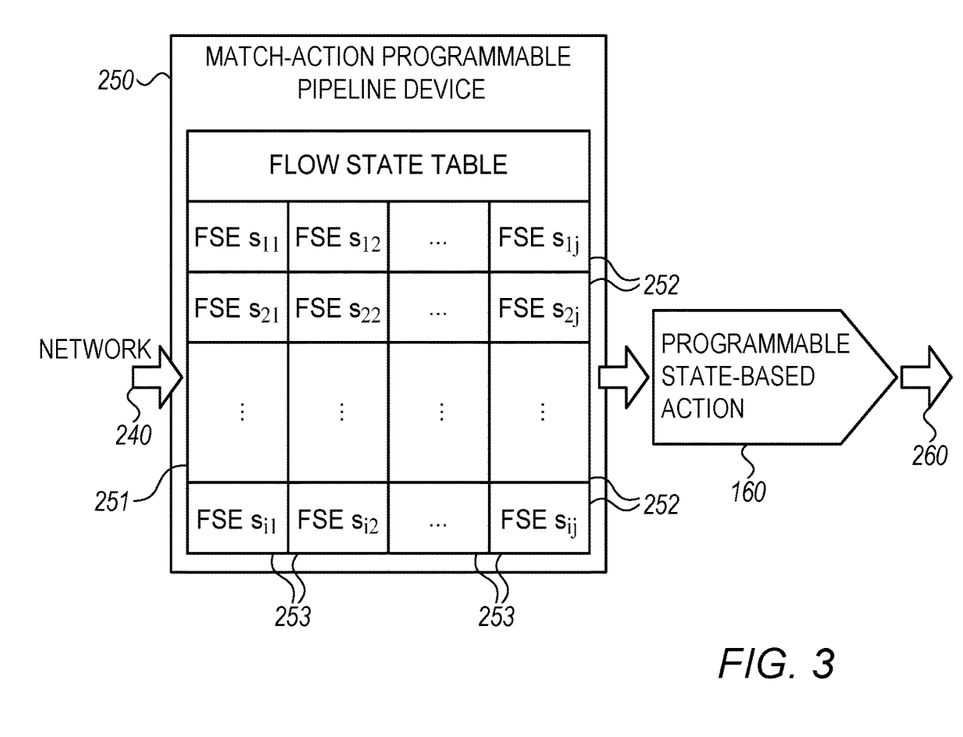
FIG. 3 shows an example of a state-table according to embodiments of the present invention.

Reference is made to FIG. 3 which shows PPD 250 that includes a state-table 251 according to some embodiments of the present invention. As shown, state-table 251 may include a plurality of rows 252 each of which includes a plurality of FSEs 253. It is noted that, as opposed to table 150 in prior art device 180 where each row in the table corresponds to a single flow state, in state-table 251, each row 252 includes FSEs 253 where each FSE includes a state of a different flow.

For example, to process packets, prior art device 180 matches an incoming packet to a row in table 150, e.g., For an incoming packet Pi, device 180 calculates a key "$Key_i$" by applying a mapping function Map on a set of fields fi1, fi2, ... fij in the incoming packet as shown by example formula A below:

$$Key_i = Key(P_i) = Map(f_{i1}, f_{i2}, \ldots f_{ij})$$ Formula A

Where fi1, fi2, ... fij are values extracted from the incoming packet, e.g., header fields or specific offsets in the packet's payload. In some embodiments, fi1, fi2, fij may be, or may include various packet attributes (and thus the mapping function may be applied to attributes of a packet), e.g., size and/or fi1, fi2, ... fij may be, or may include, any other data available to a stage in a programmable pipeline, e.g., data extracted and/or created by a previous stage in the pipeline and added or included, to a packet, as metadata.

To find, determine or retrieve the state of a flow to which the incoming packet belongs, device 180 accesses table 150 using a matching function Match. For example, for a packet $P_i$ the relevant or corresponding state ($State_i$) is retrieved by accessing a matching entry in a state table Ts, calculated by applying a matching function Match on the key, as shown by example formula B below:

$$State_i = T_s[Match(T_s, Key_i)]$$ Formula B

Accordingly, each packet or flow is mapped to a row in state-table 150. For example, each row in state table 150 stores one, and only one, flow state entry (FSE) even if the size of the FSE is smaller than the size or capacity of the row.

In some embodiments, multiple FSEs are packed into a single row of a state-table thus better utilizing the lookup or state-table. Consequently, the scale or capacity of the state-table is increased and therefore, a PPD can handle more flows or more applications. As further described, a plurality of keys calculated for a respective plurality of flows may be mapped to a single, same row in a state-table where different keys are further mapped to different offsets in the row, accordingly, a single row in a state-table can be used for storing multiple FSEs and thus the capacity of the state-table (and the PPD) is increased.

In some embodiments, a row (or entry) in a state-table may include, or store, a plurality of FSEs. For example, assuming the size of each row 252 in state-table 251 is eight bytes and two bytes suffice in order to store an FSE then an embodiment may store four FSEs 253 in each row 252 where each of the four FSEs stores or includes data describing the state of respective four different flows. Of course, a mapping function is used such that each of the four different flows is mapped to its FSE, that is, a mapping function (e.g., as described herein) applied to fields in an incoming packet may produce a key that may be used to retrieve the FSE of the flow to which the incoming packet belongs.

For example and to illustrate, starting with a matching function F=Match($P_i$) used to find the location of an entry M in in state-table 251 for packet Pi (e.g., as done by device 180), in some embodiments, F may be replaced by F'=Match'(Pi) so that each of a set of K flows is mapped to the same row 252. For example, a function may produce a single, same value or key, based on headers or payload of a set of packets which are included in, or are part of a set of different flows. For example, when formula A is applied to packets of different flows, the same $Key_i$ (or $Key_i$ value) may be produced. For example, the space of possible values that $Key_i$ can assume may be an integer multiplicity of the size of a row 252. After calculating a $Key_i$ which, as described, may point to a row in state-table 251, the specific FSE in the row may be identified by an additional function (or same function F') may calculate the offset of the relevant FSE in row 252.

For example, using example formula C below, a function may map $Key_i$ to a domain or space of size N*K:

$$F(p_i) = Hash_{nk}(Key_i)$$ Formula C

And, using example formula D below, the space may be reduced to an offset in a row 252:

$$F'(p_i) = Hash_{nk}(Key_i) \text{div } k$$ Formula D

For example, remaining with the above example of a state-table with row size of eight bytes and FSE size of two bytes, a function applied to a set of headers or payload offsets in packets that belong to a set of four different flows may produce a $Key_i$ value that is somewhere between zero (0) and thirty nine (39) and the value may then be divided by four (e.g., since there are four FSEs in each row 252). Accordingly, any $Key_i$ value that is between zero and nine (0-9) may be mapped to the first entry in a row 252 (e.g., at offset 0), any $Key_i$ value that is between ten and nineteen (10-19) may be mapped to the second entry in the row 252 (e.g., at offset 1) and so on. Similarly, any $Key_i$ value that is between forty and forty nine (40-49) may be mapped to the first entry in the next row 252 of state-table 251.

For example, for a state-table with M entries or rows each of size W (e.g., eight bytes as in above example), and FSE size D (e.g., FSEs size is two bytes as in above example), an embodiment may set or calculate the number of FSEs that be recorded in the state-table S by S=M*(W/D). For example, in prior art systems and methods, a state-table with ten rows of eight bytes and an FSE with a size of two bytes can only store ten (S=10) FSEs, however, by calculating the number of FSEs that can be stored using S=10*(8/2), an embodiment may increase the capacity of the same state-table to forty (S=40).

Of course, a method as described herein may be used for finding an FSE for an incoming computer data packet, finding a location in state-table 251 for storing a new FSE, deleting an FSE and/or updating or modifying an FSE.

In some embodiments, a method of processing a packet may include applying a mapping-function to a set of attributes of a packet to produce or calculate a location of an FSE in a state-table, wherein each row in the state-table includes at least two FSEs, the method may further include determining the state of a flow based on the content or structure, size, or other characteristics of the FSE.

For example, provided with, or otherwise knowing, the size of each row 252 in state-table 251 and the size of each FSE 253, control device 205 may determine that four FSEs can fit in each row 252 and may thus populate or initialize state-table 251 with four different FSEs in each row 252. Control device 205 may further provide PPD 250 with a mapping function that properly maps packets or flows to the right, correct or relevant FSE, e.g., a function of headers, payload or attributes of a packet as described. As described, an FSE may include, record or store a state of a flow, e.g., the state may be encoded in bits as known in the art. For example, an FSE may include or indicate a state of a flow that is "Active" or "Inactive", an FSE may include an indication of a category, e.g., in the form of a category number or value or an FSE may include a state of a protocol, e.g., in the case of the transmission control protocol, (TCP), an FSE may include an indication of one of: "NONE", "SYN", "SYN-ACK" or "ESTABLISHED".

In some embodiments, a mapping-function may provide or return a row in a state-table and an offset in the row. For example, remaining with the above example, dividing a $Key_i$ value by forty (40) may readily produce the row number.

In some embodiments, a state-table (e.g., state-table 251) may be included or represented in a PPD. For example, control device 205 may create state-table 251 in PPD 250 or control device 205 may instruct PPD 250 to create state-table 251 and may further provide PPD 250 with a mapping function that may be used, by PPD 250, in order to locate FSEs as described.

In some embodiments, a first FSE in a row in a state-table describes a state of a first flow and wherein a second, different FSE in the same row describes a state of a second, different flow. For example, states of four different flows may be described or recorded in respective four different FSEs in a single row 252 of table 251, and, each of the FSEs may be, independently from the other FSEs, accessed when a packet belonging to the relevant flow is received and/or processed.

In some embodiments, at least one action may be selected and performed based on information in an FSE. For example, having located and/or retrieved or read an FSE by PPD 250 as described, a programmable state-based action unit 160 may perform an action that is selected based on the state of the flow. For example, an action may be, or may include, modifying an incoming packet and forwarding the modified packet, sending a response to a source of the packet, dropping the packet and so on. Any action performed on, or with respect to a packet, by a PPD as known in the art may be performed based on data in an FSE identified in a state-table as described herein. Generally, logic in state-based action unit 160 is adapted to perform one or more actions when processing a packet, the actions performed depending on the state of the corresponding flow. To illustrate, if the state of the corresponding flow is "A" then state-based action unit 160 may perform action "B", if the state is "C" then state-based action unit 160 may perform action "B" and so on. Accordingly, after an FSE which describes the state is found or retrieved, and is provided to state-based action unit 160, state-based action unit 160 can perform an action based on the state described in the FSE. It will be understood that the A, B, C examples are highly simplified, that is, an embodiment may use as input any information in an FSE, e.g., a combination of different fields, entries or elements in an FSE and apply any logic or function on the input in order to select an action.

Finding an FSE (or a location of an FSE, e.g., row and offset) in a state-table may be used by embodiments of the invention for any applicable or relevant purpose. For example, based on a location of an FSE in state-table 251, PPD 250 and/or programmable state-based action unit 160 may add an FSE to state-table 251 (e.g., when the first packet of a new flow is received), remove an FSE from the state-table 251 (e.g., when a flow or session is terminated) and/or update an FSE in state-table 251, e.g., PPD 250 may determine, based on headers or content of a packet, that the state of a flow has changed to a new state, may find the relevant FSE as described and may update the FSE such that it reflects the new state of the flow.

In some embodiments, a first portion of an FSE is included in a first row of the state-table and a second portion of the FSE is included in a second row of the state-table. For example, assuming that the size of FSEs 253 is two bytes but the size of each row 252 is nine (9) bytes. In such case, each row 252 can store four FSEs plus half of a fifth FSE and the second half of the fifth FSE may be stored or included in the next or subsequent row or entry of table. For example, in embodiments where access to a table is done by index (e.g. direct), or when a hash function used for mapping a key to an entry is monotonic or in general allows identifying "next" row easily, an FSE may be split into two rows or entries of a table.

For example, remaining with the above example where a $Key_i$ value that is somewhere between zero (0) and thirty nine (39) is mapped to a first row, $Key_i$ values between forty and seventy nine (40-79) are mapped to the second row and so on, if the size of each row 252 in state-table 251 is nine bytes (and not eight) then the mapping may be changed such that $Key_i$ values between forty and fifty nine (40-59) are mapped to the last byte in the first row 252 and PPD 250 is adapted to retrieve an FSE by parts, e.g., retrieve the first byte of the FSE from the last byte in the first row of table 251 and retrieve the second byte of the FSE from the last byte in the second row of state-table 251. Of course, any other logic may be used to store and/or retrieve a first portion or part of an FSE in a first row of a table and store and/or retrieve a second portion or part of the FSE in a second row of the table.

Embodiments of the invention improve the fields of computer networking and packet processing by increasing the capacity of lookup tables thus increasing the number of flows a system or device can handle simultaneously.

For example, consider a PPD in which a certain state table tracks a state of TCP sessions passing through the device. TCP is defined in request for comments (RFC) 793, where the following states of a TCP session are defined as: LISTEN, SYN-SENT, SYN-RECEIVED, ESTABLISHED, FIN-WAIT-1, FIN-WAIT-2, CLOSE-WAIT, CLOSING, LAST-ACK, TIME-WAIT, and the fictional state CLOSED (fictional since it corresponds to no-connection). Some networking systems or services, a firewall or a Network Address Translation (NAT) service, may involve tracking the session state, and acting based on its current state. For example, a firewall may identify improper state transition based on current a packet and current session or flow state (in an FSE) and such improper transition may lead to selection and execution of actions such as blocking (dropping) the packet and/or closing the session. Depending on the number of states that may be relevant for the PPD action, between one and five bits are required to represent current session state.

Consider for example a service that tracks eight TCP states using three bits in a dedicated State Table $T_1$. In this example, assume that table $T_1$ is addressable by a mapping function, and a miss on a $T_1$ lookup corresponds to a closed session. Consider an example in which a state table in a PPD includes rows of width (size) of 30 bits, and a total capacity of 10 million rows. In this example, a flow corresponds to a TCP session, and can be identified by a 5-tuple consisting of the following fields of the TCP header: Source-IP, Destination-IP, Source-port, Destination-port, Protocol.

A typical (current or known) implementation of such table will be able to process up to 10 million concurrent sessions (flows)—in case all rows are used, where each entry corresponds to a single FSE. However, some embodiments of the invention, using the compression of FSEs and tables as described, may use three bits to describe the eight states in each FSE, so that each row of the table can track a total of ten sessions. Accordingly, using embodiments of the invention, the total service capacity in the above example can be increased in one example to a total of a hundred million concurrent sessions (flows).

Figure 4:
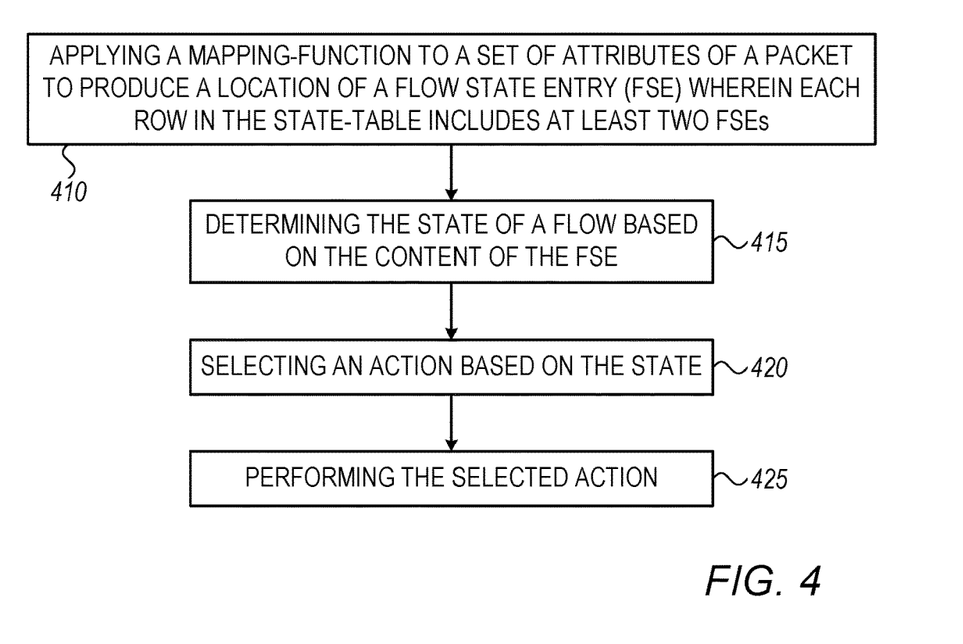
FIG. 4 shows a flowchart of a method according to illustrative embodiments of the present invention.

Reference is made to FIG. 4 which shows a flowchart of a method according to illustrative embodiments of the present invention. As shown by block 410, a mapping-function may be applied to a set of attributes of a packet to produce a location of an FSE in a state-table. For example, a mapping function as shown by formula D (applied to a key produced by a function as shown in formula A) may be applied to a set of attributes of a packet to produce a location of an FSE in a state-table. As further shown in block 410, each row or entry in a state-table may include at least two FSEs. For example, each row 252 in state-table 251 may include a plurality of FSEs 253 that include states of a respective plurality of flows.

As shown by block 415, a state of a flow may be determined based on content of an FSE. For example, FSEs may include a description of a state of a flow as described, accordingly, a state may be determined based on information included in an FSE. As shown by block 420, an action may be selected based on a state of a flow. For example, logic in state-based action unit 160 may select an action based on a state as described. As shown by block 425, a selected action may be performed. For example, state-based action unit 160 may perform a selected action as described.

In the description and claims of the present application, each of the verbs, "comprise" "include" and "have", and conjugates thereof, are used to indicate that the object or objects of the verb are not necessarily a complete listing of components, elements or parts of the subject or subjects of the verb. Unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of an embodiment as described. In addition, the word "or" is considered to be the inclusive "or" rather than the exclusive or, and indicates at least one of, or any combination of items it conjoins.

The invention claimed is:

1. A computer-implemented method of processing a computer data packet, the method comprising:
producing a single key from a set of attributes of a given packet;
applying a mapping function to the key to produce a location of a flow state entry (FSE) in a state table, wherein the location includes a row in the state table and an offset in the row, and wherein each row in the state table includes at least two FSEs; and
determining the state of a flow based on the content of the FSE.

2. The method of claim 1, wherein the state table is included in a programmable pipeline device.

3. The method of claim 1, wherein a first FSE describes a state of a first flow and wherein a second, different FSE describes a state of a second, different flow.

4. The method of claim 1, wherein a first portion of an FSE is included in a first row of the state table and a second portion of the FSE is included in a second row of the state table.

5. The method of claim 1, comprising, performing at least one action, the action selected based on information in the relevant FSE.

6. The method of claim 1, comprising, performing at least one of: adding an FSE to the state table, removing an FSE from the state table and updating an FSE in the state table.

7. A computer implemented method of processing a computer data packet, the method comprising:
receiving a packet;
producing a single key from a set of attributes of the packet;
applying a mapping function to the key to produce a location of a flow state entry (FSE) in a state table, wherein the location includes a row in the state table and an offset in the row, and wherein each row in the state table includes at least two FSEs;
determining the state of a flow based on the content of the FSE; and
selecting an action to perform based on the state.

8. The method of claim 7, wherein the state table is included in a programmable pipeline device.

9. The method of claim 7, wherein a first FSE describes a state of a first flow and wherein a second, different FSE describes a state of a second, different flow.

10. The method of claim 7, wherein a first portion of an FSE is included in a first row of the state table and a second portion of the FSE is included in a second row of the state table.

11. The method of claim 7, comprising, performing at least one of: adding an FSE to the state table, removing an FSE from the state table and updating an FSE in the state table.

12. A system comprising:
a memory; and
a controller configured to:
produce a single key from a set of attributes of a given packet;
apply a mapping function to the key to produce a location of a flow state entry (FSE) in a state table, wherein the location includes a row in the state table and an offset in the row, and wherein each row in the state table includes at least two FSEs; and
determine the state of a flow based on the content of the FSE.

13. The system of claim 12, wherein the state table is included in a programmable pipeline device.

14. The system of claim 12, wherein a first FSE describes a state of a first flow and wherein a second, different FSE describes a state of a second, different flow.

15. The system of claim 12, wherein a first portion of an FSE is included in a first row of the state table and a second portion of the FSE is included in a second row of the state table.

16. The system of claim 12, wherein the controller is configured to perform at least one action, the action selected based on information in the relevant FSE.

17. The system of claim 12, wherein the controller is configured to perform at least one of: adding an FSE to the state table, removing an FSE from the state table and updating an FSE in the state-table.

* * * * *